United States Patent
McKeone et al.

(10) Patent No.: US 12,547,229 B2
(45) Date of Patent: Feb. 10, 2026

(54) DYNAMIC PCI EXPRESS OUTPUT SWING VOLTAGE TUNING

(71) Applicant: INTERNATIONAL BUSINESS MACHINES CORPORATION, Armonk, NY (US)

(72) Inventors: Patrick James McKeone, Beacon, NY (US); John S. Werner, Fishkill, NY (US); Luke L. Jenkins, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 18/743,854

(22) Filed: Jun. 14, 2024

(65) Prior Publication Data
US 2025/0383695 A1    Dec. 18, 2025

(51) Int. Cl.
*G06F 1/26* (2006.01)
*G06F 13/42* (2006.01)
*G06N 3/08* (2023.01)

(52) U.S. Cl.
CPC ............ *G06F 1/26* (2013.01); *G06F 13/4282* (2013.01); *G06N 3/08* (2013.01); *G06F 2213/0026* (2013.01)

(58) Field of Classification Search
CPC .... G06F 1/24; G06F 13/4282; G06F 22/0024; G06N 3/08
See application file for complete search history.

(56) References Cited

U.S. PATENT DOCUMENTS

| | | | |
|---|---|---|---|
| 10,146,729 B2 * | 12/2018 | Jimenez | G06F 13/4282 |
| 10,461,805 B2 | 10/2019 | Iyer | |
| 10,824,581 B2 * | 11/2020 | Nash | G06F 13/4282 |
| 11,029,748 B2 * | 6/2021 | Klacar | G06F 13/28 |

OTHER PUBLICATIONS

McKeone, et al., "Maximizing Bandwidth Utilization by Selecting Appropriate Mode of Operation For PCIe Card," Application and Drawings, Filed on Oct. 31, 2023, 48 Pages, U.S. Appl. No. 18/385,476.

* cited by examiner

*Primary Examiner* — Terrell S Johnson
(74) *Attorney, Agent, or Firm* — Robert D. Bean

(57) ABSTRACT

According to one embodiment, a method, computer system, and computer program product for adjusting output swing voltage of a Peripheral Component Interconnect Express (PCIe) system is provided. The present invention may include training a neural network, recording, in real time, lane input data of PCIe lanes comprising a PCIe link, generating eye diagrams representing the PCIe lanes based on the lane input data, predicting, by the trained neural network, predicted eye heights for the PCIe lanes, and adjusting a current output swing voltage of one or more PCIe lanes based on the predicted eye heights.

20 Claims, 3 Drawing Sheets

DYNAMIC PCI EXPRESS OUTPUT SWING VOLTAGE TUNING

BACKGROUND

The present invention relates, generally, to the field of computing, and more particularly to hardware interfaces.

In computing, an interface is a shared boundary across which two or more separate components of a computer system exchange information. This exchange may take place between software agents, computer hardware, peripheral devices, human users, et cetera. Hardware interfaces exist in almost all components of a computing system, such as buses, storage devices, other I/O devices, processors, etc. A hardware interface often takes the form of a hardware connector, such as a plug, socket, et cetera, that physically contacts another hardware connector of another device, as well the mechanical, electrical, and logical signals at the hardware interface and the protocol for sequencing them. The field of hardware interfaces may be the technological field concerned with the development and implementation of such hardware connectors, signals, and sequences, as well as systems, software, components, standards, et cetera that enable the different physical components of a computing system to communicate and work together effectively. The field of hardware interfaces encompasses a wide range of technologies, protocols, and standards that facilitate interaction between various hardware components, devices, and systems. These technologies may include, for example, physical connectors and cables, communications protocols, driver software, and interface standards.

Hardware interfaces are typically designed to conform to an interface standard; an interface standard is a set of rules and specifications that describe functional characteristics and/or physical characteristics necessary to allow the exchange of information between two or more components of a computing system. Physical characteristics describe electrical, mechanical, or optical characteristics of interface hardware such as physical connectors and cables, and functional characteristics describe the functional steps that must be executed to enable and/or facilitate data exchange over the interface hardware between physically or wirelessly interfacing hardware components, which may be described and/or implemented via protocols, drivers, firmware, software programs, et cetera. Interface standards may be promulgated by public or private organizations within an industry, and may be widely adopted within an industry; for example, commonly used interface standards may include USB, HDMI, Ethernet, SATA I2C, SPI, Bluetooth, and PCIe. Interface standards are crucial for ensuring compatibility and interoperability between different hardware components in an industry, and play a significant role in enabling the functionality, reliability, efficiency, and performance required in modern computing systems.

SUMMARY

According to one embodiment, a method, computer system, and computer program product for adjusting output swing voltage of a Peripheral Component Interconnect Express (PCIe) system is provided. The present invention may include training a neural network, recording, in real time, lane input data of PCIe lanes comprising a PCIe link, generating eye diagrams representing the PCIe lanes based on the lane input data, predicting, by the trained neural network, predicted eye heights for the PCIe lanes, and adjusting a current output swing voltage of one or more PCIe lanes based on the predicted eye heights.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
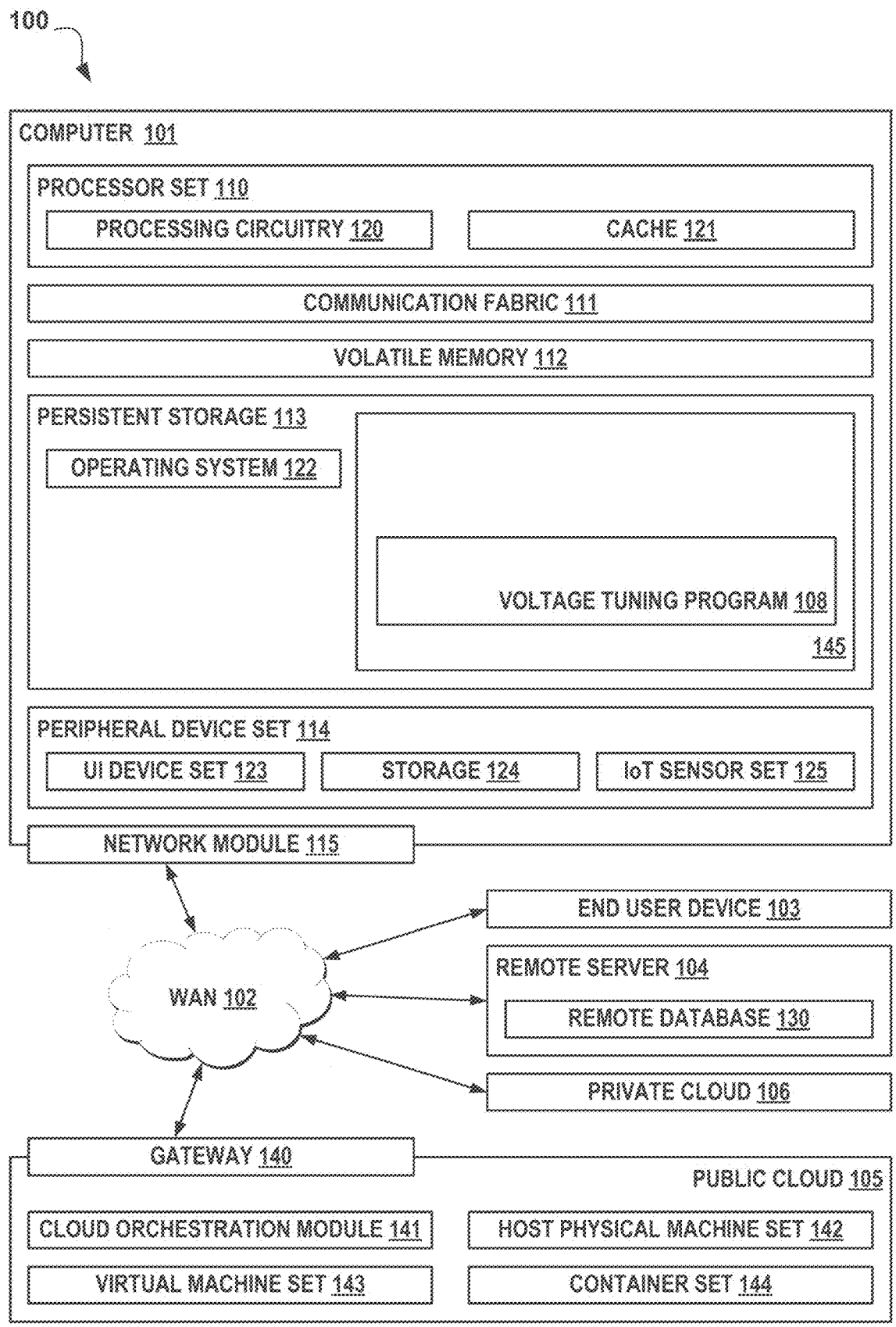
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to hardware interfaces. The following described exemplary embodiments provide a system, method, and program product to, among other things, leverage machine learning to analyze a combination of lane-by-lane eye measurement data and receiver error data to reduce output swing voltage of a PCIe link to a PCIe spec approved voltage.

As previously described, the field of hardware interfaces may be the technological field concerned with the development and implementation of hardware connectors, signals, and sequences, as well as systems, software, components, standards, et cetera that enable the different physical components of a computing system to communicate and work together effectively.

One widely adopted standard in the computing industry is that of Peripheral Component Interconnect Express, officially abbreviated as "PCIe." PCIe is a high-speed serial computer expansion bus standard which governs motherboard interfaces for graphics cards, sound cards, hard disk drive host adapters, SSDs, Wi-Fi, and Ethernet hardware connections in personal computers. PCIe is based on point-to-point topology, with separate serial links connecting every device to the host. Under PCIe, hardware devices communicate via a logical connection called a link, which is a point-to-point communication channel between two devices connected via a PCIe-standard hardware interface. The PCIe hardware interface may physically comprise two PCIe connectors: an edge connector at one device, and a PCIe slot at the other device, where the edge connector fits into the PCIe slot to form a physical interface between the devices. Each PCIe connector may comprise a transmitter, which serializes and encodes data to be sent over the PCIe link, and a receiver, which deserializes and decodes incoming data received over the PCIe link. At the physical level, the link is composed of one or more lanes; a lane is a single serial data transmission line through which data may be simultaneously sent and received in the form of packets. The lane may physically comprise two channels; a channel for transmitting data, and a channel for receiving data. Each channel may comprise two wires or, in the context of printed circuit boards, two traces.

PCIe channels use differential signaling to transmit information using complementary signals, whereby the two wires/traces of a channel respectively carry voltage signals, one positive or high signal, and one negative or low signal, which are equal in magnitude but which are of opposing polarities; the receiver responds to the differences between the two signals, resulting in a signal with a magnitude twice as large as each individual signal. The peak-to-peak voltage difference between the two signals, or the difference in voltage between the peak voltage of the high signal and the peak voltage of the low signal, is referred to herein as the swing voltage. The magnitude of the swing voltage is directly proportional to the power consumption of the PCIe lane. The PCIe standard defines the voltage levels of the high signal and the low signal, and the swing voltage between them.

As in any system utilizing high-speed electronic communication, maintaining signal quality in the transmitted information is crucial. Signal quality refers to a number of different qualities of a signal that affect the integrity and clarity of the signal, and may be visualized using an eye diagram; an eye diagram represents the voltage over time of a data signal as it switches between high and low states, and is created by overlaying multiple cycles of the signal to represent all transitions. The eponymous "eye" of the eye diagram is an open area in the center of the diagram where the signal transitions between logical states 1 and 0 do not occur; the height of this eye represents the difference between the highest and lowest voltage levels of the signal that do not interfere with each other. A larger eye height indicates a better signal-to-noise ratio, and typically indicates that the signal is less likely to experience errors due to noise or interference. In other words, the higher the eye height, the better the signal quality, and the smaller the eye height, the worse the signal quality. The eye height is measured in millivolts (mV). The eye width is usually measured in rated insulation voltage (UI) or some time-based value. The combination of eye height and width is used to create a figure of merit which is unique to each PCIe device vendor and is a measure of quality. The PCIe standard specifies a minimum signal quality that a PCIe interface must exceed to ensure that data can be transmitted accurately across the interface even at high speeds; as such, the eye diagram representing the signals transmitted over a PCIe interface must exceed a minimum eye height to meet the minimum signal quality requirements set forth by the PCIe standard.

The quality of a signal, as expressed through the eye height, is directly connected to the voltage swing of that signal. In other words, a higher voltage swing results in a larger eye height and better signal quality, and a lower swing voltage results in a lower eye height and lower signal quality; this is because the greater the voltage difference between the high and low states of the signal, the easier it is to distinguish between logical '1' and '0', and the better the signal-to-noise ratio (SNR) associated with the signal. Conversely, the smaller the voltage difference between the high and low states of the signal, the harder it becomes to distinguish between logical '1' and '0', and the worse the signal-to-noise ratio (SNR) associated with the signal.

As such, due to the importance of maintaining signal quality, many current methods of implementing PCIe standards ensure compliance with minimum signal quality requirements by adding a voltage buffer or margin to the swing voltage during operation of the PCIe lane; this margin ensures that the quality of the signal does not fall below the minimum signal quality requirements but can exceed, sometimes greatly, the minimum swing voltage prescribed by the PCIe standard or PCIe specification or PCIe spec, resulting in power draw in excess of what is needed to transmit the data. Furthermore, the margin may be so great that it exceeds the PCIe minimum signal quality requirements as well. In other words, PCIe links at full swing output voltage often contain an unnecessary margin of peak-to-peak voltage; as a result, PCIe lanes draw more power than needed during data transfer, resulting in wasted energy and unnecessary heat buildup. Excessive power draw can cause unnecessary operational stress on the PCIe links and the components to which they are attached, as well as operational stress on the power supply and electrical infrastructure providing power to such components. Stress can shorten the operational lifespan of affected components, and can reduce the reliability of such components over time. Excessive heat buildup can damage or degrade the performance of PCIe links and attached components, and if such heat accumulates to sufficient levels, can damage, or degrade the performance of any other components of the system connected to, physically proximate to, or enclosed with the PCIe links and attached components.

As such, it may be advantageous to, among other things, implement a system that leverages machine learning to analyze a combination of lane-by-lane eye measurement data and receiver error data to reduce output swing voltage of a PCIe link to a minimum PCIe-approved voltage while exceeding minimum PCIe-approved signal quality requirements, thereby tailoring the power consumption on a lane-by-lane basis to only that which is needed to perform data transfer functions and maintain quality. Therefore, the present embodiment has the capacity to improve the technical field of hardware interfaces by providing a method that reduces power consumption by PCIe lanes without sacrificing data transfer functionality, thereby reducing power draw and associated heat generation by PCIe devices and improving efficiency, operational longevity, reliability, and performance of both PCIe devices and other devices in the same system while preventing premature failure and damage due to overheating. In other words, such a system would improve sustainability of a computing system utilizing PCIe connections by reducing operational stress on the components, allowing components to last longer and potentially be reused.

According to at least one embodiment, the invention may be a processor-implemented method for adjusting output swing voltage of a Peripheral Component Interconnect Express (PCIe) system, the method comprising: training a neural network; recording, in real time, lane input data of one or more PCIe lanes comprising a PCIe link; generating one or more eye diagrams representing the one or more PCIe lanes based on the lane input data; predicting, by the trained neural network, one or more predicted eye heights for the one or more PCIe lanes; and adjusting a current output swing voltage of one or more PCIe lanes based on the one or more predicted eye heights. Separately adjusting the output swing voltage of the one or more PCIe lanes based on the predicted eye heights enables the present embodiment to limit the voltage consumed by the PCIe lanes to the minimum voltage needed to maintain signal quality for each individual lane, reducing power consumption of the individual PCIe lanes the PCIe link as a whole.

According to at least one embodiment, the invention may be a computer system for adjusting output swing voltage of a Peripheral Component Interconnect Express (PCIe) system, the computer system comprising: one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising: training a neural network; recording, in real time, lane input data of one or more PCIe lanes comprising a PCIe link; generating one or more eye diagrams representing the one or more PCIe lanes based on the lane input data; predicting, by the trained neural network, one or more predicted eye heights for the one or more PCIe lanes; and adjusting a current output swing voltage of one or more PCIe lanes based on the one or more predicted eye heights. Separately adjusting the output swing voltage of the one or more PCIe lanes based on the predicted eye heights enables the present embodiment to limit the voltage consumed by the PCIe lanes to the minimum voltage needed to maintain signal quality for each individual lane, reducing power consumption of the individual PCIe lanes the PCIe link as a whole.

According to at least one embodiment, the invention may be a computer program product for adjusting output swing voltage of a Peripheral Component Interconnect Express (PCIe) system, the computer program product comprising: one or more computer-readable tangible storage medium and program instructions stored on at least one of the one or more tangible storage medium, the program instructions executable by a processor to cause the processor to perform a method comprising: training a neural network; recording, in real time, lane input data of one or more PCIe lanes comprising a PCIe link; generating one or more eye diagrams representing the one or more PCIe lanes based on the lane input data; predicting, by the trained neural network, one or more predicted eye heights for the one or more PCIe lanes; and adjusting a current output swing voltage of one or more PCIe lanes based on the one or more predicted eye heights. Separately adjusting the output swing voltage of the one or more PCIe lanes based on the predicted eye heights enables the present embodiment to limit the voltage consumed by the PCIe lanes to the minimum voltage needed to maintain signal quality for each individual lane, reducing power consumption of the individual PCIe lanes the PCIe link as a whole.

According to embodiments, the invention may comprise dynamically recording a plurality of link input data associated with the PCIe link. Recording the link input data associated with the PCIe link enables the present embodiment to take into account the link recoveries, link receiver error data, and link utilization in predicting the predicted eye height, further tailoring the energy consumption of a lane and/or link to more closely match minimum energy needs.

According to embodiments, the present invention may comprise creating one or more margins based on the link input data and the lane input data. Creating margins based on the link input data and the lane input data enables the embodiment to tailor a buffer of voltage based on the link recoveries, link receiver error data, and link utilization, enabling the embodiment to factor such information into prediction of the predicted eye height and further tailor the energy consumption of a lane and/or link to more closely match minimum energy needs.

According to embodiments of the present invention, the predicting is based on the one or more created margins. Predicting the predicted eye height based on the one or more created margins allows the predicted eye height to take into account the link input data, further tailoring the energy consumption of a lane and/or link to more closely match minimum energy needs.

According to embodiments of the present invention, the adjusting may comprise: responsive to determining that one of the one or more predicted eye heights is greater than a current output swing voltage of a PCIe lane, raising a current output swing voltage of the PCIe lane; and responsive to determining that one of the one or more predicted eye heights is lower than a current output swing voltage of a PCIe lane, lowering a current output swing voltage of the PCIe lane. Such embodiments enable dynamic adjustment of the current output swing voltage, which serves to further reduce the power consumed by the PCIe link.

According to embodiments of the present invention, the adjusting may be based on an expected link speed and an expected utilization. Performing the adjusting based on an expected link speed and an expected utilization allows the embodiment to perform more granular tailoring of the current output swing voltage of the PCIe lane, which serves to further reduce the power consumed by the PCIe link.

References in the specification to "one embodiment," "other embodiment," "another embodiment," "an embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to affect such feature, structure, or characteristic in connection with other embodiments whether or not explicitly described.

For purposes of the description hereinafter, the terms "upper", "lower", "right", "left", "vertical", "horizontal", "top", "bottom", and derivatives thereof shall relate to the disclosed structures and methods, as oriented in the drawing figures. The terms "overlying," "atop," "over," "on," "positioned on" or "positioned atop" mean that a first element is present on a second element wherein intervening elements, such as an interface structure, may be present between the first element and the second element. The term "direct contact" means that a first element and a second element are connected without any intermediary conducting, insulating, or semiconductor layers at the interface of the two elements.

In the interest of not obscuring the presentation of the embodiments of the present invention, in the following detailed description, some of the processing steps, materials, or operations that are known in the art may have been combined together for presentation and for illustration purposes and in some instances may not have been described in detail. Additionally, for brevity and maintaining a focus on distinctive features of elements of the present invention, description of previously discussed materials, processes, and structures may not be repeated with regard to subsequent Figures. In other instances, some processing steps or operations that are known may not be described. It should be understood that the following description is rather focused on the distinctive features or elements of the various embodiments of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to leverage machine learning to analyze a combination of lane-by-lane eye measurement data and receiver error data to reduce output swing voltage of a PCIe link to a PCIe spec approved voltage.

Referring now to FIG. 1, computing environment 100 contains an example of an environment for the execution of at least some of the computer code involved in performing the inventive methods, such as code block 145, which may comprise voltage tuning program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data.

Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the voltage tuning program 108 may be a program enabled to leverage machine learning to analyze a combination of lane-by-lane eye measurement data and receiver error data to reduce output swing voltage of a PCIe link to a PCIe spec approved voltage. The voltage tuning program 108 may, when executed, cause the computing environment 100 to carry out a voltage tuning process 200. The voltage tuning process 200 may be explained in further detail below with respect to FIG. 2. The voltage tuning program 108 may, when executed, cause the computing environment 100 to carry out a voltage tuning process 300. The voltage tuning process 300 may be explained in further detail below with respect to FIG. 3. In embodiments of the invention, the voltage tuning program 108 may be stored and/or run within or by any number or combination of devices including computer 101, end user device 103, remote server 104, private cloud 106, and/or public cloud 105, peripheral device set 114, and/or on any other device connected to WAN 102. Furthermore, voltage tuning program 108 may be distributed in its operation over any number or combination of the aforementioned devices.

Figure 2:
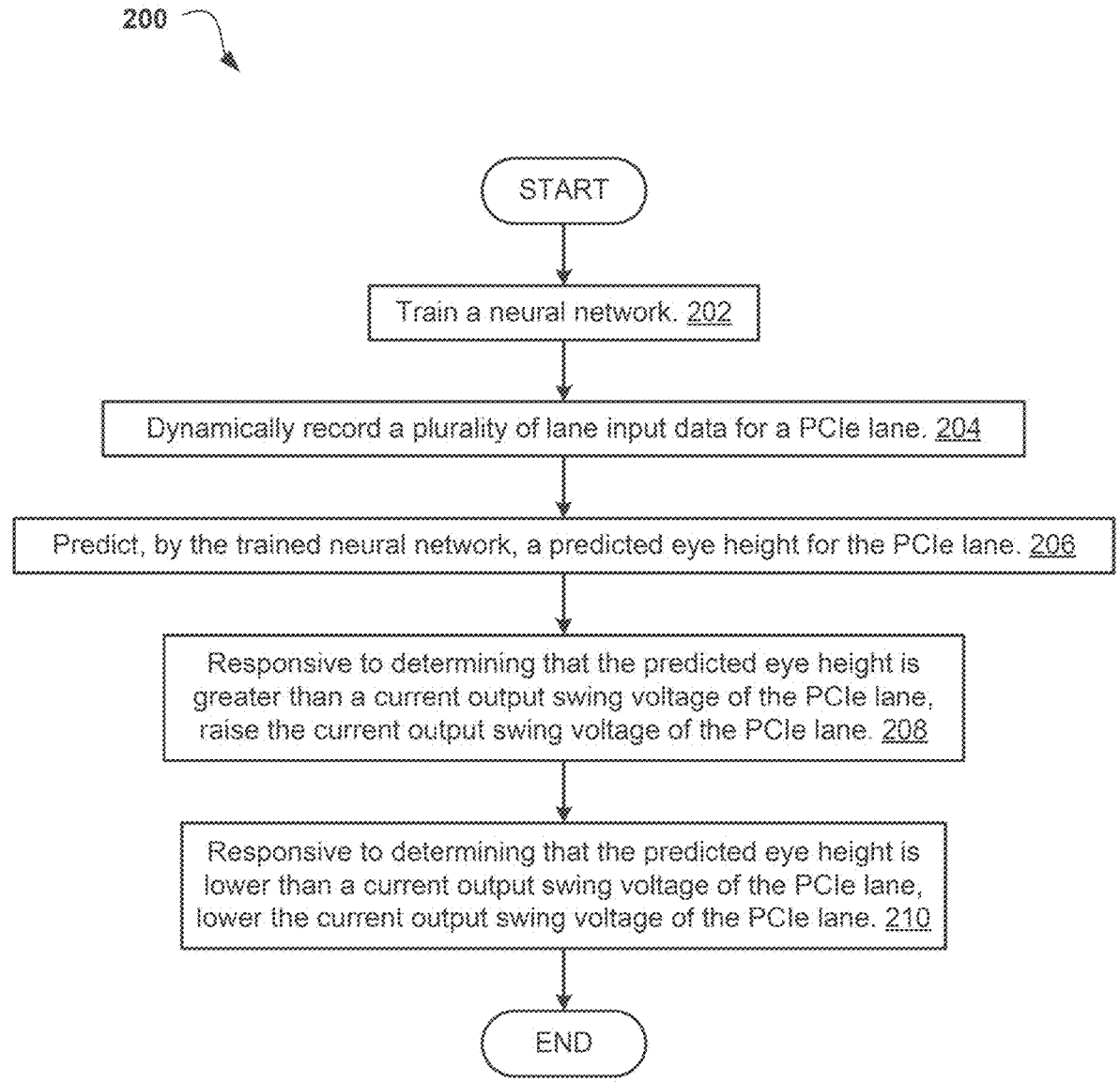
FIG. 2 is an operational flowchart illustrating a voltage tuning process according to at least one embodiment.

Referring now to FIG. 2, an operational flowchart illustrating a voltage tuning process 200 is depicted according to at least one embodiment. At 202, the voltage tuning program 108 may train a neural network. The neural network may be a machine learning program comprising an artificial mathematical model, implemented in software, that comprises a number of interconnected neurons arranged into layers: a first layer, or input layer; one or more intermediate layers, or hidden layers; and a final layer, or output layer. Information may enter at the input layer, pass through connected neurons comprising the one or more hidden layers, and arrive at the output layer. At each neuron, the input information may be modified according to that neuron's activation function based on the strength of the neuron's connection to the connected neuron in the previous layer; as such, the behavior of the neural network depends on the strength of the connections between neurons, represented as the weights.

The voltage tuning program 108 may train the neural network in a training phase to output a predicted eye height for the PCIe lane. In embodiments, for example where the voltage tuning program 108 has access to the transmitters and receivers of the two PCIe compatible devices connected by the PCIe lane, the voltage tuning program 108 may generate a training dataset for the neural network with respect to the individual PCIe lane. The voltage tuning program 108 may generate a training dataset by executing a test methodology or pattern on the lane, such as a compliance pattern, or by using the PCIe specified idle pattern; while the test methodology is executing, the voltage tuning program 108 may continuously measure the eye height at the receiver while incrementally lowering the output swing voltage from its initial default state of full swing voltage. The voltage tuning program 108 may continuing to measure the eye height of the lane at each adjustment and monitor for errors at the receiver. Errors at the receiver may take the form of correctable errors, such as replay num rollovers. During this process, the voltage tuning program 108 may output measured data as a table set of, for example, "Output Swing Voltage," "Eye Height," and "Receiver Errors." The voltage tuning program 108 may continue incrementally stepping down the output swing voltage until the voltage tuning program 108 detects a number of errors at the receiver that exceed a threshold error rate, where the threshold error rate represents a pre-provided number of errors that may be considered unacceptably high, and/or which represent a number of errors that degrade the signal quality of the signals below an acceptable minimum level. The PCIe specification allows for a specific bit error rate; in embodiments, the voltage tuning program 108 may use this PCIe bit error rate as the threshold error rate, or the voltage tuning program 108 may use some predetermined lower error rate. In embodiments, the voltage tuning program 108 may alternatively or additionally measure the eye height of the lane and continue incrementally stepping down the output swing voltage until the voltage tuning program 108 detects that the signal quality as represented by the eye height has fallen below a threshold level of quality, which may be the minimum eye height specified by the PCIe specification. The training data resulting from this process represents a sampling of the full range of possible output swing voltages at the PCIe lane, from full swing voltage to the minimum swing voltage possible before the number of errors and/or signal quality of the signals fall below a minimum threshold. This range of possible output swing voltages represents the range of acceptable swing voltage levels within which the voltage tuning program 108 may operate to find the most efficient voltage swing levels in terms of power consumption. This range of output swing voltages will be different for each lane, due to the cumulative effect of small variables in the lane's construction, such as the printed circuit board material, copper trace design, type of connectors, type of cables, et cetera comprising the PCIe lane. For this reason, training the neural network on a training dataset generated from a particular PCIe lane improves the neural network's performance during the inference phase when provided input data from that PCIe lane.

The voltage tuning program 108 may train the neural network on the training dataset and the minimum eye height specified by the PCIe standard; by ingesting the training dataset, the neural network may learn the relationship between output swing voltage and eye height, and how changes in output swing voltage affect the eye height of the PCIe lane. The voltage tuning program 108 may further train the neural network on a PCIe standard minimum eye height from a desired revision of the PCIe standards; by learning the eye height produced by any given output voltage at that PCIe lane, the neural network is be equipped to provide a predicted eye height; the predicted eye height is the lowest output voltage of the lane that will result in an eye height that exceeds the minimum eye height provided by the PCIe standard.

At 204, the voltage tuning program 108 may dynamically record a plurality of lane input data for a PCIe lane. The lane input data may be data pertaining to the signals transmitted over the PCIe lane and/or signals transmitted over each wire or trace of the PCIe lane, such as voltage over time, voltage swing per pair of wires/traces over time, polarity of the signals, magnitude of the signals, frequency of the signals, et cetera. The lane input data may be recorded and/or communicated to the voltage tuning program 108 in real time or near-real-time, so as to allow the voltage tuning program 108 to determine a current state of the PCIe lane. The voltage tuning program 108 may obtain input data, for example, by interfacing with a measurement tool integrated into the PCIe device that provides the eye height data as an output through a few methods like an MRPC command or some other PCIe in-band request.

The voltage tuning program 108 may generate or receive an eye diagram representing the lane input data from the PCIe device. Most PCIe devices, such as, for example, PCIe switches, re-timers, ASICs, FPGAs, et cetera, are equipped with tools that provide eye diagrams from the die of the PCIe device. The voltage tuning program 108 may access these tools, for example through some communication protocol such as I2C, MRPC, or in-band PCIe commands, to retrieve an eye diagram as part of the input data. The eye diagram may comprise a graph that represents the quality and integrity of the digital signals comprising the lane input data. The vertical or X-axis of the graph represents voltage or signal amplitude and shows how the signal transitions between different voltage levels, while the horizontal or Y-axis of the graph represents time. The graph is divided into two halves, with one half representing one bit period and the other half representing the subsequent bit period. The voltage tuning program 108 or the PCIe device may create the eye diagram by overlaying the multiple signals comprising the input data on top of each other. The overlayed signals form a pattern comprising a central "eye," which may comprise the opening between the upper and lower signals. The voltage tuning program 108 may measure and record the height of this eye opening as the eye height. In embodiments, for example where the voltage tuning program 108 is recording or receiving lane input data in real-time, the voltage tuning program 108 may continually update the eye diagram with newly recorded or received lane input data, such that the eye diagram represents an accurate and current representation of all available lane input data.

At 206, the voltage tuning program 108 may predict, by the trained neural network, a predicted eye height for the PCIe lane. The predicted eye height may be the lowest output voltage of the lane that will result in an eye height that exceeds the minimum eye height provided by the PCIe standard. The voltage tuning program 108 may predict the predicted eye height by providing the lane input data to the trained neural network and receiving the predicted eye height as output. The voltage tuning program 108 may predict the predicted eye height once or may predict the predicted eye height at regular intervals and/or in real-time or near-real-time based on lane input data.

At 208, the voltage tuning program 108 may, responsive to determining that the predicted eye height is greater than a current output swing voltage of the PCIe lane, raise the current output swing voltage of the PCIe lane. Here, the voltage tuning program 108 may extract the current output swing voltage of the PCIe lane from the input data, which may be the most recent output swing data recorded for the lane that falls within a threshold period from the present time. The voltage tuning program 108 may compare the current output swing voltage against the predicted eye height output by the trained neural network; if the predicted eye height exceeds the current output swing voltage based on the comparison, the voltage tuning program 108 may update the output swing voltage of the lane to raise the output swing voltage. In embodiments, the voltage tuning program 108 may raise the voltage by the minimum increments allowed by the PCIe device, such as 100 millivolts. The voltage tuning program 108 may update the output swing voltage of the lane by issuing in-band commands to adjust PCIe registers comprising the PCIe connector.

At 210, the voltage tuning program 108 may, responsive to determining that the predicted eye height is lower than a current output swing voltage of the PCIe lane, lower the current output swing voltage of the PCIe lane. Here, the voltage tuning program 108 may extract the current output swing voltage of the PCIe lane from the input data. The voltage tuning program 108 may compare the current output swing voltage against the predicted eye height output by the trained neural network; if the predicted eye height falls below the current output swing voltage based on the comparison, the voltage tuning program 108 may update the output swing voltage of the lane to lower the output swing voltage to match link health requirements based on expected link speed and utilization. The voltage tuning program 108 may update the output swing voltage of the lane by issuing in-band commands to adjust PCIe registers comprising the PCIe connector.

Figure 3:
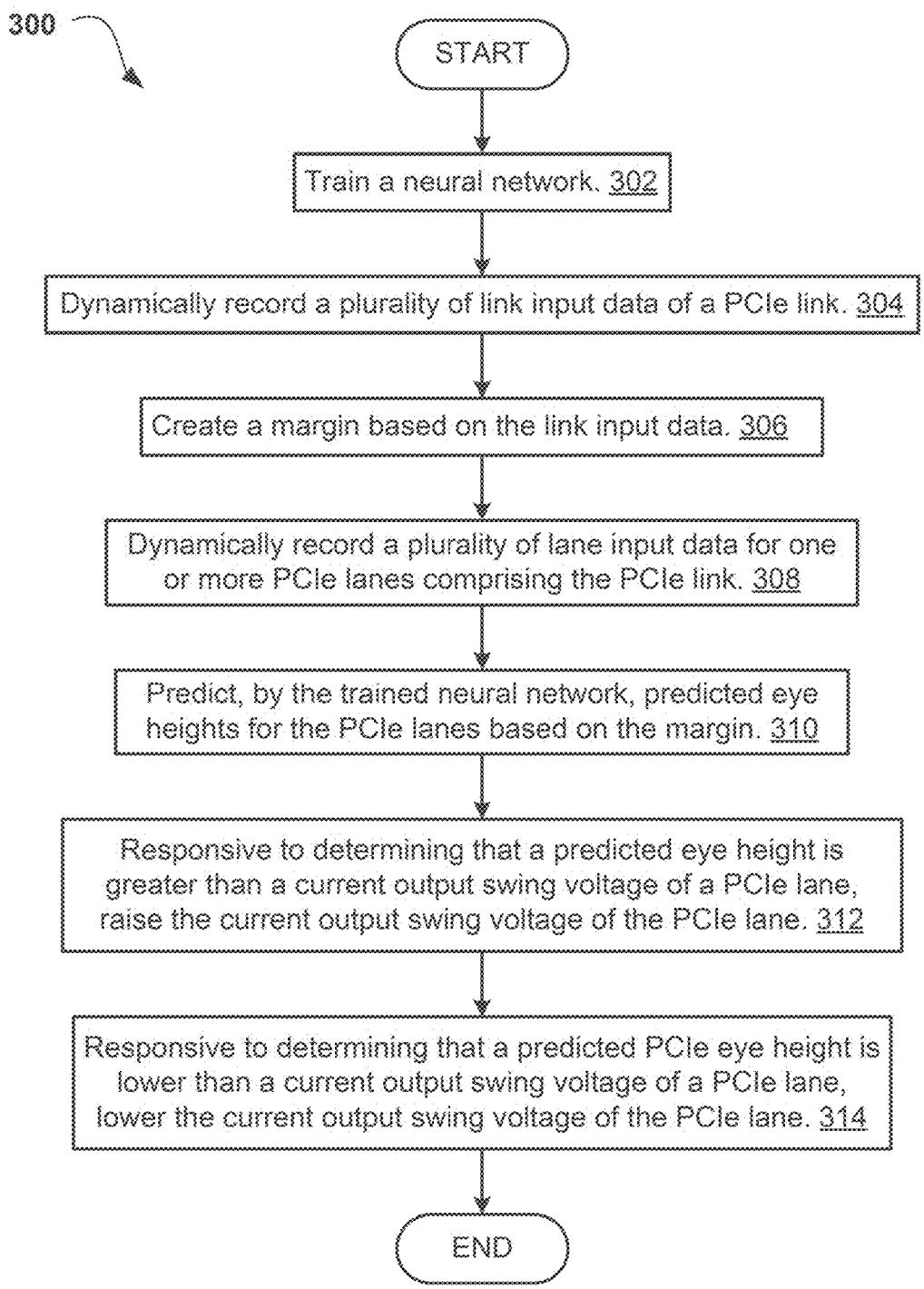
FIG. 3 is an operational flowchart illustrating a voltage tuning process according to at least one embodiment.

Referring now to FIG. 3, an operational flowchart illustrating a voltage tuning process 300 is depicted according to at least one embodiment. At 302, the voltage tuning program 108 may train a neural network. The neural network may be a machine learning program comprising an artificial mathematical model, implemented in software, that comprises a number of interconnected neurons arranged into layers: a first layer, or input layer; one or more intermediate layers, or hidden layers; and a final layer, or output layer. Information may enter at the input layer, pass through connected neurons comprising the one or more hidden layers, and arrive at the output layer. At each neuron, the input information may be modified according to that neuron's activation function based on the strength of the neuron's connection to the connected neuron in the previous layer; as such, the behavior of the neural network depends on the strength of the connections between neurons, represented as the weights.

The voltage tuning program 108 may train the neural network in a training phase to output a predicted eye height for the PCIe lanes comprising the PCIe link; the predicted eye height may be the minimum required eye height. In embodiments, for example where the voltage tuning program 108 has access to the transmitters and receivers of the two PCIe compatible devices connected by the PCIe link, the voltage tuning program 108 may generate a training dataset for the neural network with respect to each individual PCIe lane. The voltage tuning program 108 may generate a training dataset by executing a test methodology or pattern on the lane, such as a compliance pattern, or by using the PCIe specified idle pattern; while the test methodology is executing, the voltage tuning program 108 may continuously measure the eye height at the receiver while incrementally lowering the output swing voltage from its initial default state of full swing voltage. The voltage tuning program 108 may continuing to measure the eye height of the lane at each adjustment and monitor for errors at the receiver. Errors at the receiver may take the form of correctable errors, such as replay num rollovers. During this process, the voltage tuning program 108 may output measured data as a table set of, for example, "Output Swing Voltage," "Eye Height," and "Receiver Errors." The voltage tuning program 108 may continue incrementally stepping down the output swing voltage until the voltage tuning program 108 detects a number of errors at the receiver that exceed a threshold error rate, where the threshold error rate represents a pre-provided number of errors that may be considered unacceptably high, and/or which represent a number of errors that degrade the signal quality of the signals below an acceptable minimum level. The PCIe specification allows for a specific bit error rate; in embodiments, the voltage tuning program 108 may use this PCIe bit error rate as the threshold error rate, or the voltage tuning program 108 may use some predetermined lower error rate. In embodiments, the voltage tuning program 108 may alternatively or additionally measure the eye height of the lane and continue incrementally stepping down the output swing voltage until the voltage tuning program 108 detects that the signal quality as represented by the eye height has fallen below a threshold level of quality, which may be the minimum eye height specified by the PCIe specification. The training data resulting from this process represents a sampling of the full range of possible output swing voltages at the PCIe lane, from full swing voltage to the minimum swing voltage possible before the number of errors and/or signal quality of the signals fall below a minimum threshold. This range of possible output swing voltages represents the range of acceptable swing voltage levels within which the voltage tuning program 108 may operate to find the most efficient voltage swing levels in terms of power consumption. This range of output swing voltages will be different for each lane, due to the cumulative effect of small variables in the lane's construction, such as the printed circuit board material, copper trace design, type of connectors, type of cables, et cetera comprising the PCIe lane. For this reason, training the neural network on a training dataset generated from a particular PCIe link improves the neural network's performance during the inference phase when provided input data from that PCIe link. In embodiments, the voltage tuning program 108 may train a separate neural network for each PCIe lane comprising the PCIe link.

The voltage tuning program 108 may train the neural network on the training dataset and the minimum eye height specified by the PCIe standard; by ingesting the training dataset, the neural network may learn the relationship between output swing voltage and eye height, and how changes in output swing voltage affect the eye height of the PCIe lane. The voltage tuning program 108 may further train the neural network on a PCIe standard minimum eye height from a desired revision of the PCIe standards; by learning the eye height produced by any given output voltage at that PCIe lane, the neural network is be equipped to provide a predicted eye height; the predicted eye height is the lowest output voltage of the lane that will result in an eye height that exceeds the minimum eye height provided by the PCIe standard.

At 304, the voltage tuning program 108 may dynamically record a plurality of link input data of a PCIe link. A PCIe link may be a point-to-point communication channel comprising a PCIe connector made up of at least two PCIe ports each connected to a different device, the PCIe link allowing connected devices to send and receive data. The PCIe link comprises one or more PCIe lanes and can vary in size from one to 16 lanes. The number of PCIe lanes comprising the PCIe link may be automatically negotiated during device initialization and can be restricted by either endpoint; in embodiments, the PCIe link can dynamically down-configure itself to use fewer lanes, providing a failure tolerance in case bad or unreliable lanes are present.

Link input data may be previous link status data such as link recoveries, receiver error data, link speed, and link utilization. Link recoveries may be events where a PCIe link has been restored to a functional state after it has experienced an error or disruption, and may occur when the link changes speed, changes lane width, experiences errors, or when the voltage tuning program 108 initially trains the link. Receiver errors may be correctable errors, where the error may be corrected by replaying the data, or uncorrectable, where the data is lost. Link utilization refers to traffic status over the link, such as bandwidth use and idle time. In embodiments, link data may be broken up into transmitter data, receiver data, and LTSSM (Link Training and Status State Machine) data. The transmitter data may be output swing voltage of the link. The receiver data may be eye height of the link and/or receiver errors. The LTSSM data may comprise link status, such as L0, recovery, electrical idle, polling, et cetera, and link speed, such as Gen1, Gen2, Gen3, et cetera. The voltage tuning program 108 may need to know all of that data, including LTSSM, to predict the predicted eye height, as the predicted eye height will change based on what speed the link is at. The voltage tuning program 108 may acquire the link input data through the PCIe devices, such as the transmitter and receiver. In embodiments, the voltage tuning program 108 may acquire the link input data through a communication protocol such as I2C, MRPC or some other in-band PCI, such as register access. The link input data may be collected at regular intervals and may be collected in real time or near-real-time.

At 306, the voltage tuning program 108 may create a margin based on the link input data. Here, the voltage tuning program 108 may use PCIe spec eye height masks, link input data, and lane input data to create margin. The margin may be a voltage buffer applied to the swing voltage during operation of a PCIe lane to ensure that the quality of the signal transmitted through the PCIe lane does not fall below a minimum signal quality. The voltage tuning program 108 can measure eye height of the lane input data and determine a margin compared to the PCIe spec's minimum eye height requirement. Margin is based on the minimum eye height and width required for a successful data transfer. For each link speed, the required minimum eye height changes per PCIe spec. PCIe spec also allows a specific amount of errors per speed, which can range from zero errors to some generous number of errors or something in between. The size of the margin may be based on link utilization; if a link is idle, the eye height is lower, and therefore more margin is required. Conversely, if a link is using maximum bandwidth at max speed, less margin will be required, as the link likely requires full swing output. The voltage tuning program 108 may generate the margin dynamically for the link based on link input data such as link utilization.

At 308, the voltage tuning program 108 may dynamically record a plurality of lane input data for the PCIe lanes comprising a PCIe link. The lane input data may be data pertaining to the signals transmitted over the PCIe lanes comprising the PCIe link and/or signals transmitted over each wire or trace of the PCIe lane, such as voltage over time, voltage swing per pair of wires/traces over time, polarity of the signals, magnitude of the signals, frequency of the signals, et cetera. The lane input data may be recorded and/or communicated to the voltage tuning program 108 in real time or near-real-time, so as to allow the voltage tuning program 108 to determine a current state of all PCIe lanes comprising the PCIe link. The voltage tuning program 108 may obtain input data, for example, by interfacing with a measurement tool integrated into the PCIe device that provides the eye height data as an output through a few methods like an MRPC command or some other PCIe in-band request.

The voltage tuning program 108 may generate or receive an eye diagram representing the lane input data from the PCIe device. Most PCIe devices, such as, for example, PCIe switches, re-timers, ASICs, FPGAs, et cetera, are equipped with tools that provide eye diagrams from the die of the PCIe device. The voltage tuning program 108 may access these tools, for example through some communication protocol such as I2C, MRPC, or in-band PCIe commands, to retrieve an eye diagram as part of the input data. The eye diagram may comprise a graph that represents the quality and integrity of the digital signals comprising the lane input data. The vertical or X-axis of the graph represents voltage or signal amplitude and shows how the signal transitions between different voltage levels, while the horizontal or Y-axis of the graph represents time. The graph is divided into two halves, with one half representing one bit period and the other half representing the subsequent bit period. The voltage tuning program 108 or the PCIe device may create the eye diagram by overlaying the multiple signals comprising the input data on top of each other. The overlayed signals form a pattern comprising a central "eye," which may comprise the opening between the upper and lower signals. The voltage tuning program 108 may measure and record the height of this eye opening as the eye height. In embodiments, for example where the voltage tuning program 108 is recording or receiving lane input data in real-time, the voltage tuning program 108 may continually update the eye diagram with newly recorded or received lane input data, such that the eye diagram represents an accurate and current representation of all available lane input data for each lane comprising the link.

At 310, the voltage tuning program 108 may predict, by the trained neural network, a predicted eye height for the PCIe lanes based on the margin. The predicted eye height may be the lowest output voltage of each lane comprising the link that will result in an eye height that exceeds the minimum eye height provided by the PCIe standard. The voltage tuning program 108 may predict the predicted eye height by providing the lane input data to the trained neural network and receiving the predicted eye height as output. The voltage tuning program 108 may then modify the predicted eye height by applying the margin. The resulting predicted eye height is accordingly based on the initial training data as well as the link input data comprising, for example, link use at idle, some set of bandwidth use, and full bandwidth use. For example, if the PCIe device is in an idle state, the voltage tuning program 108 can predict the eye height requirement to change to a lower predicted eye height, allowing the voltage tuning program 108 to lower the output swing, reducing power consumption. As traffic picks up over the link, the voltage tuning program 108 can predict the eye height requirement increasing and raise the output swing, thereby enabling the voltage tuning program 108 to provide only as much voltage as is needed to fulfil the eye height requirement. This gives the neural network data to predict margin based on output swing, so long as the voltage tuning program 108 is constantly collecting and comparing results of lane input data such as output swing, eye height, link utilization, et cetera. The voltage tuning program 108 may predict the predicted eye height once or may predict the predicted eye height at regular intervals and/or in real-time or near-real-time based on lane input data.

In embodiments, the voltage tuning program 108 may apply the determined margin to the predicted eye height based on available output swing voltage granularity. Output swing granularity may be the minimum increments by which the output swing voltage may be changed. Because there is no PCIe spec for output swing granularity, and output swing granularity changes per vendor or PCIe device, the margin may have to be adapted to match the output swing granularity. For example, in any given processor or ASIC, the granularity may be 1 mV, 10 mV, 100 mV, et cetera, such that an output swing voltage of 20.1 mV could not be achieved. In such situations, the voltage tuning program 108 may, for example, round the margin and/or the final predicted eye height based on the output swing granularity of the PCIe device.

At 312, the voltage tuning program 108 may, responsive to determining that a predicted eye height is greater than a current output swing voltage of a PCIe lane, raise the current output swing voltage of the PCIe lane. Here, the voltage tuning program 108 may extract the current output swing voltage of the PCIe lane from the input data, which may be the most recent output swing data recorded for the lane that falls within a threshold period from the present time. The voltage tuning program 108 may compare the current output swing voltage against the predicted eye height output by the trained neural network; if the predicted eye height exceeds the current output swing voltage based on the comparison, the voltage tuning program 108 may update the output swing voltage of the lane to raise the output swing voltage to match link health requirements based on expected link speed and utilization. For example, if the PCIe link is consistently at Gen4 and using 20-40% of the PCIe link's allowable bandwidth, a specific margin of output swing will be available to the voltage tuning program 108. If the same PCIe device has a separate PCIe link that is running Gen3 at 80-100% of its allowable bandwidth, there will be a difference margin of output swing available to the voltage tuning program 108. The neural network may use the training and subsequent data to determine the minimum eye height expected for a given output swing; the voltage tuning program 108 raises when that prediction is either incorrect (lower eye height than expected for a given swing) or when the voltage tuning program 108 detects, via the link input data, that the link is experiencing unexpected receiver errors exceeding a threshold value. The voltage tuning program 108 may update the output swing voltage of the lane by issuing in-band commands to adjust PCIe registers comprising the PCIe connector.

At 316, the voltage tuning program 108 may, responsive to determining that a predicted eye height is lower than a current output swing voltage of a PCIe lane, lower the current output swing voltage of the PCIe lane. Here, the voltage tuning program 108 may extract the current output swing voltage of the PCIe lane from the input data. The voltage tuning program 108 may compare the current output swing voltage against the predicted eye height output by the trained neural network; if the predicted eye height falls below the current output swing voltage based on the comparison, the voltage tuning program 108 may update the output swing voltage of the lane to lower the output swing voltage to match link health requirements based on expected link speed and utilization. The voltage tuning program 108 may update the output swing voltage of the lane by issuing in-band commands to adjust PCIe registers comprising the PCIe connector.

It may be appreciated that FIGS. 2-3 provide only illustrations of individual implementations and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for adjusting output swing voltage of a Peripheral Component Interconnect Express (PCIe) system, the method comprising:
    training a neural network;
    recording, in real time, lane input data of one or more PCIe lanes comprising a PCIe link;
    generating one or more eye diagrams representing the one or more PCIe lanes based on the lane input data;
    predicting, by the trained neural network, one or more predicted eye heights for the one or more PCIe lanes; and
    adjusting a current output swing voltage of one or more PCIe lanes based on the one or more predicted eye heights.

2. The method of claim 1, further comprising: dynamically recording a plurality of link input data associated with the PCIe link.

3. The method of claim 2, further comprising: creating one or more margins based on the link input data and the lane input data.

4. The method of claim 3, wherein the predicting is based on the one or more created margins.

5. The method of claim 1, wherein the adjusting comprises: responsive to determining that one of the one or more predicted eye heights is greater than a current output swing voltage of a PCIe lane, raising a current output swing voltage of the PCIe lane.

6. The method of claim 1, wherein the adjusting comprises: responsive to determining that one of the one or more predicted eye heights is lower than a current output swing voltage of a PCIe lane, lowering a current output swing voltage of the PCIe lane.

7. The method of claim 1, wherein the adjusting is based on an expected link speed and an expected utilization.

8. A computer system for adjusting output swing voltage of a Peripheral Component Interconnect Express (PCIe) system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    training a neural network;
    recording, in real time, lane input data of one or more PCIe lanes comprising a PCIe link;
    generating one or more eye diagrams representing the one or more PCIe lanes based on the lane input data;
    predicting, by the trained neural network, one or more predicted eye heights for the one or more PCIe lanes; and
    adjusting a current output swing voltage of one or more PCIe lanes based on the one or more predicted eye heights.

9. The computer system of claim 8, further comprising: dynamically recording a plurality of link input data associated with the PCIe link.

10. The computer system of claim 8, further comprising: creating one or more margins based on the link input data and the lane input data.

11. The computer system of claim 8, wherein the predicting is based on the one or more created margins.

12. The computer system of claim 8, wherein the adjusting comprises: responsive to determining that one of the one or more predicted eye heights is greater than a current output swing voltage of a PCIe lane, raising a current output swing voltage of the PCIe lane.

13. The computer system of claim 8, wherein the adjusting comprises: responsive to determining that one of the one or more predicted eye heights is lower than a current output swing voltage of a PCIe lane, lowering a current output swing voltage of the PCIe lane.

14. The computer system of claim 8, wherein the adjusting is based on an expected link speed and an expected utilization.

15. A computer program product for adjusting output swing voltage of a Peripheral Component Interconnect Express (PCIe) system, the computer program product comprising:
    one or more computer-readable tangible storage medium and program instructions stored on at least one of the one or more tangible storage medium, the program instructions executable by a processor to cause the processor to perform a method comprising:
    training a neural network;
    recording, in real time, lane input data of one or more PCIe lanes comprising a PCIe link;
    generating one or more eye diagrams representing the one or more PCIe lanes based on the lane input data;
    predicting, by the trained neural network, one or more predicted eye heights for the one or more PCIe lanes; and adjusting a current output swing voltage of one or more PCIe lanes based on the one or more predicted eye heights.

16. The computer program product of claim 15, further comprising: dynamically recording a plurality of link input data associated with the PCIe link.

17. The computer program product of claim 15, further comprising: creating one or more margins based on the link input data and the lane input data.

18. The computer program product of claim 15, wherein the predicting is based on the one or more created margins.

19. The computer program product of claim 15, wherein the adjusting comprises: responsive to determining that one of the one or more predicted eye heights is greater than a current output swing voltage of a PCIe lane, raising a current output swing voltage of the PCIe lane.

20. The computer program product of claim 15, wherein the adjusting comprises: responsive to determining that one of the one or more predicted eye heights is lower than a current output swing voltage of a PCIe lane, lowering a current output swing voltage of the PCIe lane.

\* \* \* \* \*